(12) United States Patent
Broer et al.

(10) Patent No.: US 6,437,841 B2
(45) Date of Patent: Aug. 20, 2002

(54) DISPLAY DEVICE COMPRISING A SCANNING WINDOW

(75) Inventors: Dirk Jan Broer; Hendrik De Koning; Gosse Charles De Vries; Mark Thomas Johnson, all of Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 46 days.

(21) Appl. No.: 09/745,913

(22) Filed: Dec. 22, 2000

(30) Foreign Application Priority Data

Dec. 24, 1999 (EP) .............................. 99204544

(51) Int. Cl.$^7$ ............................................ G02F 1/1335
(52) U.S. Cl. ...................... 349/88; 349/81; 349/106
(58) Field of Search ...................... 349/88, 106, 77, 349/81, 16, 86, 87

(56) References Cited

U.S. PATENT DOCUMENTS

| 5,200,845 A | * 4/1993 | Crooker et al. ............... 349/86 |
| 5,821,833 A | * 10/1998 | Lakin |
| 5,873,154 A | * 2/1999 | Talvilelei |

FOREIGN PATENT DOCUMENTS

| EP | 0000422 | * 1/1979 |
| EP | 0488116 | * 6/1992 |
| EP | 0568355 | * 11/1993 |
| EP | 060955 | * 8/1994 |

* cited by examiner

Primary Examiner—James Dudek
(74) Attorney, Agent, or Firm—Aaron Waxler (57) ABSTRACT

A display device (1) is provided with a means (15) for selectively transmitting and blocking light from specific areas of the image. The means for blocking comprises an LCD cells or a number of LCD cells, which cells comprises an oriented polymer network, an LC material with negative $\Delta\epsilon$ and a pleochroic dye.

5 Claims, 9 Drawing Sheets

DISPLAY DEVICE COMPRISING A SCANNING WINDOW

The invention relates to a display device comprising a display window and means for generating light at areas of the display window and means for selectively time-sequentially activating the said areas, said display device comprising positioned in front of the display window, or forming part of the display window, a means for selectively transmitting light from activated areas, and blocking at least partly light from non-activated areas.

Many display devices of many different types are known, for instance CRT's (Cathode ray tubes), PDP (Plasma Display Devices), LCD (Liquid Crystal Displays), and many other types.

In general a display device comprises a display window. The image is displayed on the display window. The display window comprises means to selectively generate light at areas of the display window. In a CRT for instance the image is built line-by-line.

A major problem for display devices is formed by reflection of ambient light on the display window or at components of the display device such as phosphor elements (in e.g. CRT's and PDP's). The viewer sees, apart from the image generated by the device, also reflections of other light sources, such as lamps and/or the sun shining on the display window. The reflections of such external (i.e. outside the display device) light sources reduces the contrast of the image displayed, and can even make it invisible especially when bright sunlight shines on the display window. Many solutions have been proposed ranging from reducing the light intensity in the room, reducing the reflection coefficient of the surfaces of the display window (anti-reflection coatings) and using dark glass for the window (the latter reduces the reflection on the inside of the display window).

It is known from European patent application no. 0 000 422 to use a means for transmitting light from activated areas, and blocking at least partly light from non-activated areas. Areas that are activated (i.e. emit light) are then seen, whereas non-active areas are black. Such a means can strongly increase the contrast. The means shuts out light from non-activated areas and transmits light from activated areas. The intensity of the image itself is not, or only to a small amount reduced, whereas the intensity of the reflected light can be strongly reduced.

Although this idea has been known for some time, and seems to be a simple and elegant solution to the problem, as yet it has not been possible to implement this solution in practice.

The gain in contrast is in practice not enough to justify the costs. It is an object of the invention to provide a display device of the type described in the opening paragraph having an increased performance.

To this end the means for transmitting light from activated areas, and blocking at least partly light from non-activated areas comprise an LCD cell or LCD cells, the LCD cell(s) comprising an oriented polymer network, an LC material with negative $\Delta\epsilon$ and a pleochroic dye, dispersed in the oriented matrix, the passive relaxation time being less than 2 milliseconds.

The invention is based on the insight that the LC cells have to 'open and close' fast, preferably within 2 milliseconds to be truly effective. An LCD cell is switched from one state (transmissive or non-transmissive) to another (non-transmissive or transmissive) in two different fashions, actively by applying voltages, and passively when the voltage over the cell is removed. By using an oriented polymer matrix and an LC material with negative $\Delta\epsilon$ a fast passive relaxation (measured as the half-way point between an open and shut orientation) when the voltage is removed of smaller than 2 milliseconds is possible.

The cell comprises also a pleochroic dye. An LCD cell with an oriented polymer network and an LC material with negative $\Delta\epsilon$ has in the non-transmissive state a high to very high scattering coefficient which would increase the reflection of outside light sources, rather than decrease it, leading to a decrease in contrast. However, the pleochroic dye absorbs light inside the LCD cell, reducing the scattered light intensity.

The presence of the pleochroic dye also decreases the effective passive relaxation time.

Preferably the cell thickness lies between 6 and 25 micrometer.

Preferably the content of the oriented polymer matrix lies between 5 and 15%. The more oriented polymer matrix the LCD cell comprises, the faster the passive relaxation is, but the more scattering occurs, also in the transmissive state. Below 5% it becomes difficult to obtain fast passive relaxation, above 15% scattering becomes a problem. The device may comprise a number of LCD cells, or a single LCD cell with many electrodes.

These and further aspects of the invention will be explained in greater detail by way of example and with reference to the accompanying drawings, in which.

The Figures are not drawn to scale. In general, like reference numerals refer to like parts.

Figure 1:
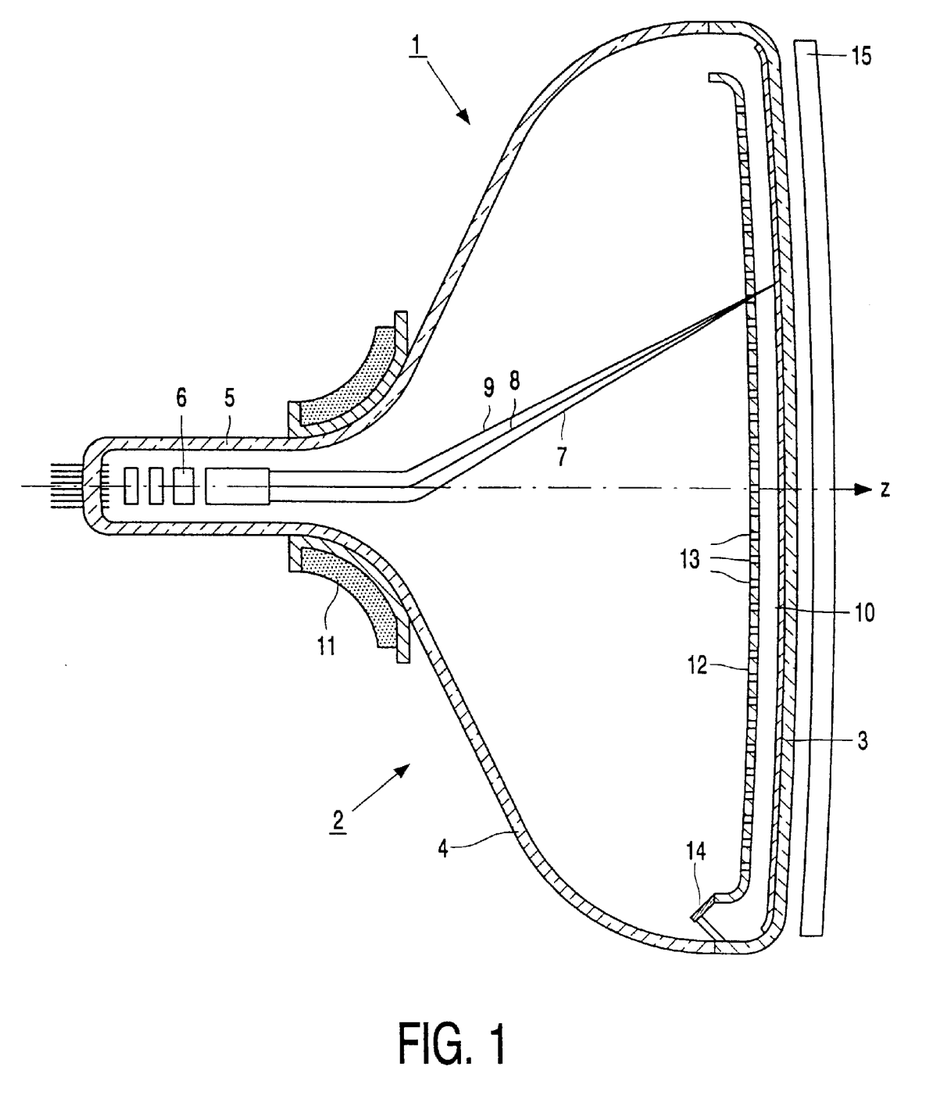
FIG. 1 shows schematically a display device in accordance with the invention.

A color display device 1 (FIG. 1) includes an evacuated envelope 2 comprising a display window 3, a cone portion 4 and a neck 5. In said neck 5 there is provided an electron gun 6 for generating three electron beams 7, 8 and 9. A display screen 10 is present on the inside of the display window. Said display screen 10 comprises a phosphor pattern of phosphor elements luminescing in red, green and blue. On their way to the display screen the electron beams 7, 8 and 9 are deflected across the display screen 10 by means of a deflection unit 11 and pass through a shadow mask 12 which is arranged in front of the display window 3 and which comprises a thin plate having apertures 13. The shadow mask is suspended in the display window by means of suspension means 14. The three electron beams converge and pass through the apertures of the shadow mask at a small angle with respect to each other and, consequently, each electron beam impinges on phosphor elements of only one colour. In FIG. 1 the axis (z-axis) of the envelope is also indicated. In front of the display window 3 a means 15 for selectively passing and blocking light is provided.

Figure 2A:
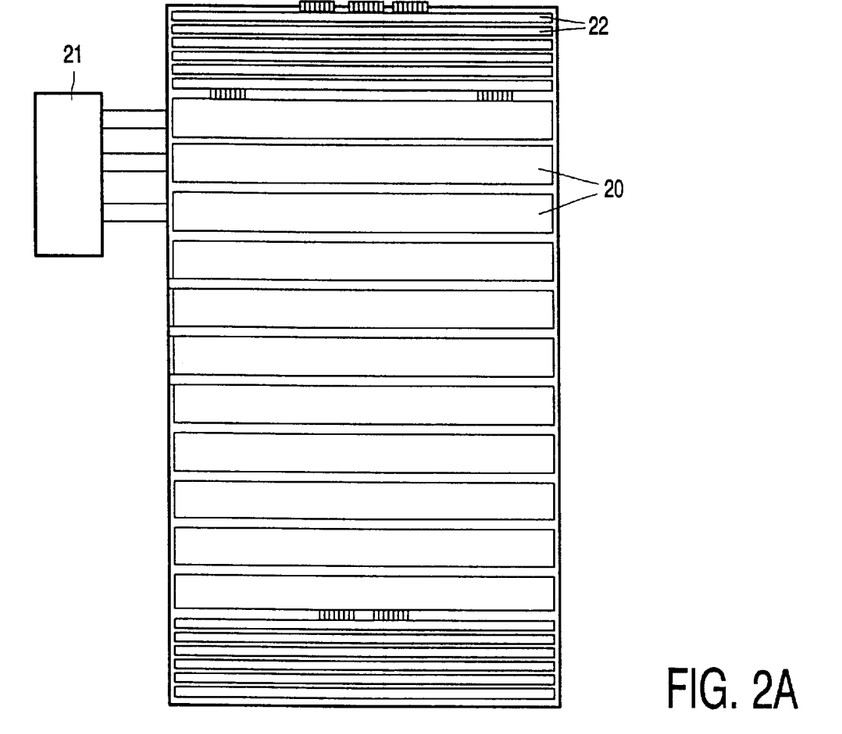
FIG. 2A shows schematically a means for transmitting light from activated areas, and blocking at least partly light from non-activated areas.

FIG. 2A shows in more detail a means 15. The means comprises a number of LCD cells 20 and means 21 to control the transmission characteristics of the LCD cell. Each cell is opened, i.e. transmissive to light emanating from the display window when the area behind the cell is activated, i.e. emits light. It is remarked that the example in FIG. 2A comprises a number of cells, it is also possible, and indeed advantageous to use a single cell having a large number of opposing electrode (for instance many pairs of opposing electrodes). Application of proper voltages will the switch the areas between the pairs of electrodes between a transmissive and a blocking state. Having a single cell is easier to make and reduce the possibility of difference in transmission/blocking properties over the display device.

Figure 2B:
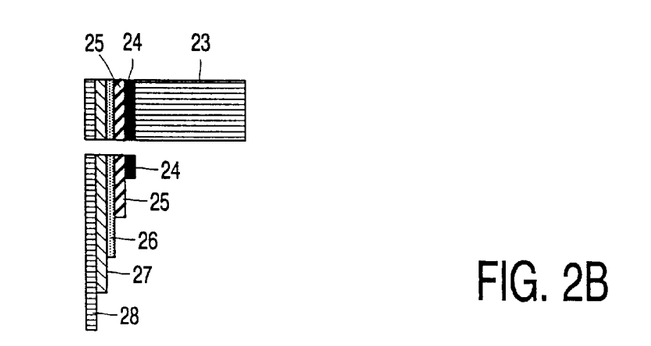
FIGS. 2B and 2C show schematically an LCD cell for use in the means shown in FIG. 2A.

FIG. 2B illustrates schematically an LCD cell for use in the invention. The LCD cell comprises an LCD material 23 which comprises in a oriented polymer network an LCD material with negative $\Delta\epsilon$ and a pleochroic dye, transparent electrodes (for instance made from ITO) 26, a barrier layer 25, a polyimide layer 24, a e.g. glass substrate 27 and optionally an anti-reflection layer 28.

Figure 2C:
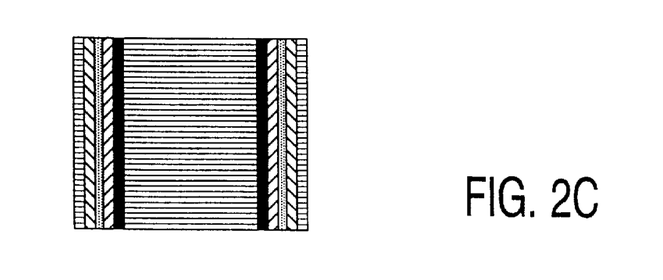

FIG. 2B shows one half of the set-up, FIG. 2C the cell in its entirety.

Figure 3A:
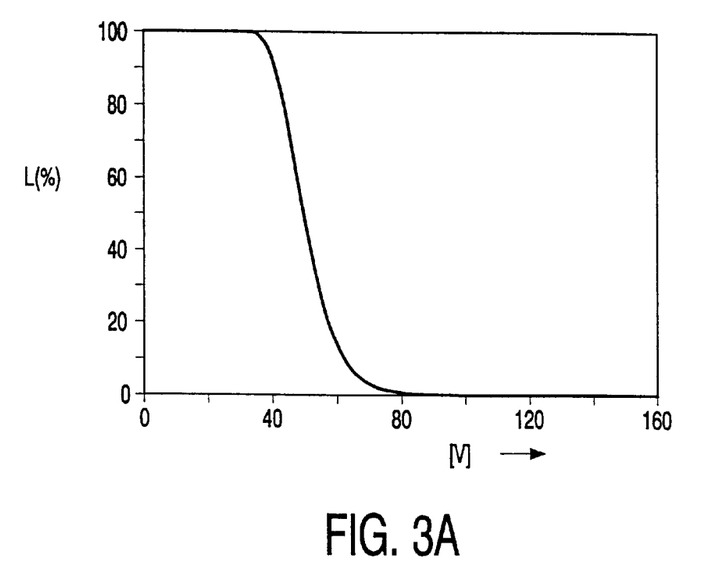
FIG. 3A illustrates the relative luminance of an image behind the LCD cell as a function of voltage over the cell.

FIG. 3A shows the relative luminance (L in percentage on the vertical axis) as a function of the voltage applied on the electrodes (V in Volts on the horizontal axis. When the cell is in the transmissive state (L =100%) application of a voltage higher than approximately 80 Volts will close the cell, which cell in this example has a thickness of 18 micrometer, and comprises 7% (by weight) of an oriented polymer network. By application of a voltage of high enough amplitude the LCD cell can therefor be closed. The time needed for 'closing' the cell is herein called the 'active switching time' $\Delta t_2$. For a proper functioning of the cell the cell, however, also has to be opened at some time. This is done by removing the voltages over the electrodes. The LCD material will then passively, i.e. not driven by outside voltages, convert back to the 'transmissive state'. The oriented polymer network is oriented in such manner that the LCD material experiences an internal force driving the LCD material to the 'transmissive state'. The time needed to open a cell is herein called the passive switching time $\Delta t_1$.

Figure 3B:
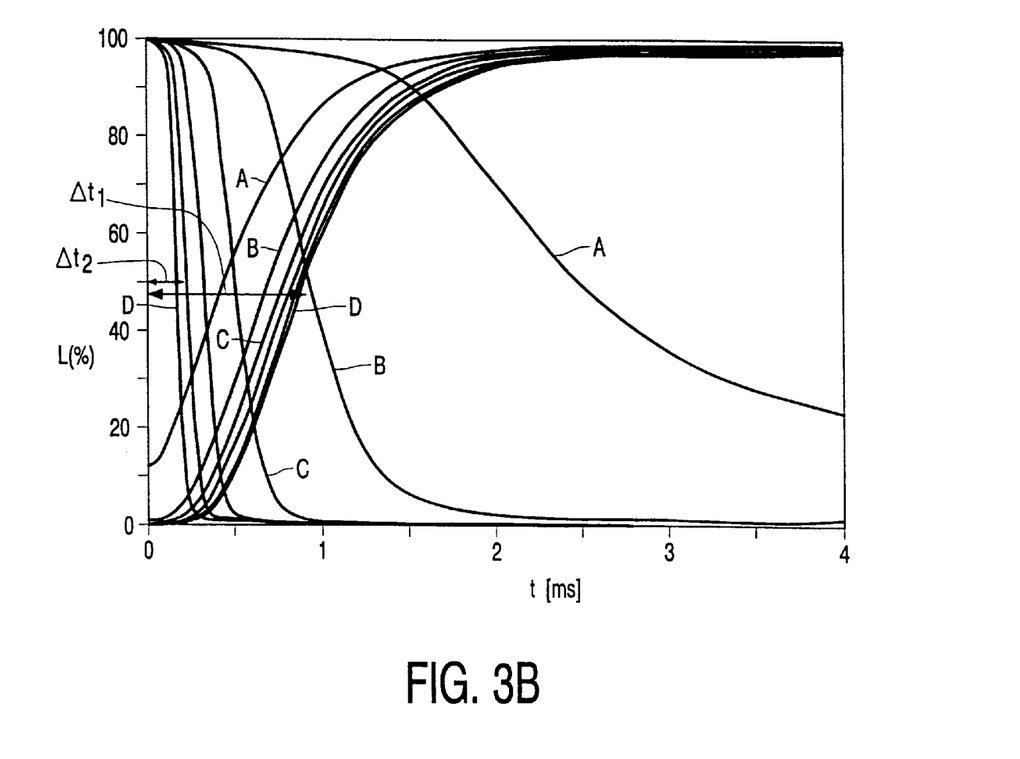
FIG. 3B illustrates the switching times both for active and for passive switching.

FIG. 3B illustrates as a function of time the closing of a cell (falling slopes) and opening of a cell (rising slopes). These slopes are drawn for may different voltages e.g. for 60 Volts (slopes A), for 80 Volts (slopes B), for 100 Volts (slopes C) and for 160 Volts (slopes D). The switching times (i.e. the time needed to arrive at a point half-way between two states) $\Delta t_1$ and $\Delta t_2$ for to open respectively close a cell are indicated in the figure. It can be seen that for a voltage higher than 100 Volt (slopes C) opening and closing time are both less than 1 millisecond.

Figure 4:
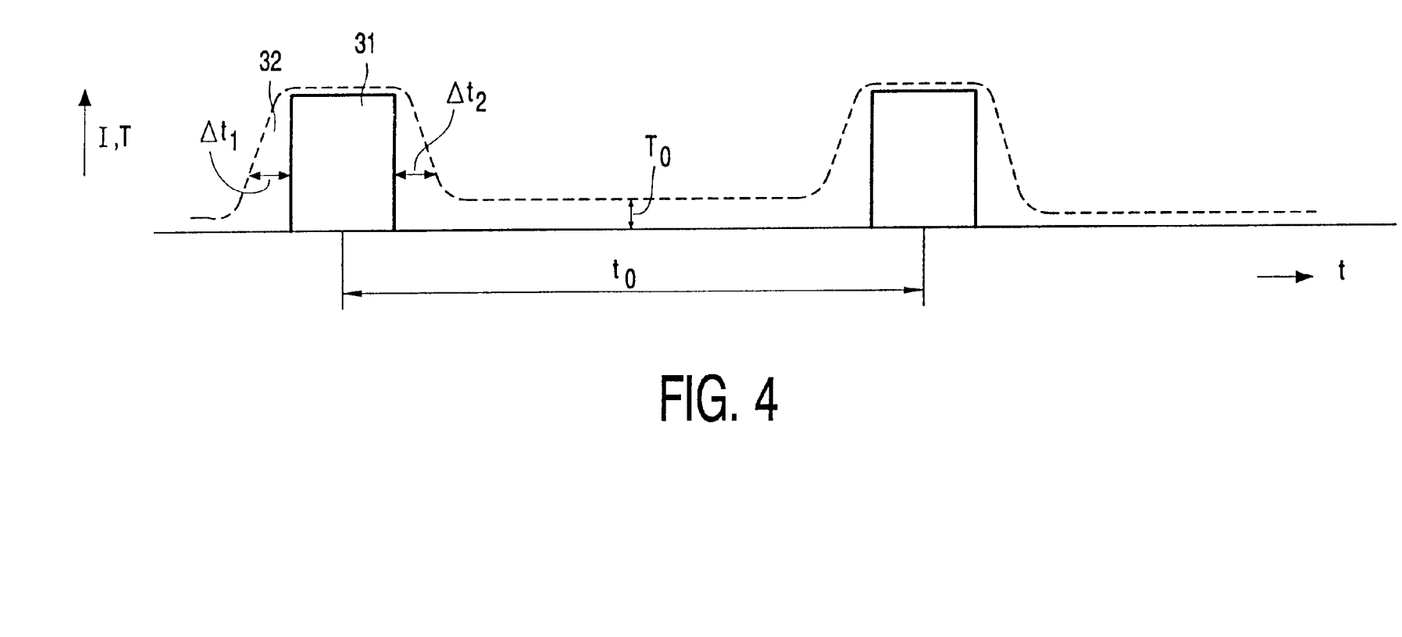
FIG. 4 schematically illustrates the relation between switching times and the frame time.

FIG. 4 illustrates schematically the intensity of the emitted light (unbroken line) and the transmission of the corresponding LCD cell (broken line) as a function of time, the times $\Delta t_1$ and $\Delta t_2$ needed to switch the LCD cell and the transmission $T_o$ in the 'closed' state of the cell.

Schematically the frame-time $t_0$ is indicated. Important parameters for the effectiveness of the LCD cell are the ratio between the frame time and $\Delta t_1$ (to 'open' the LCD cell) and $\Delta t_2$ (to 'close' the LCD cell), the transmission $T_0$ in the 'closed' state and furthermore (not illustrated in FIG. 3) the reflection of the LCD cell itself. Both $\Delta t_1$ and $\Delta t_2$ should be substantially smaller than the frame time $t_0$, $T_o$ should be small, and the LCD cell should not reflect much light. The frame time is typically 20 (50 Hz) to 10 (100 Hz) milliseconds. Especially for the shorter frame times (100 Hz) the above set of seems to rule out the use of LCD cells. A number of different types of LCD cells are known. There are types that work with interference filters and LCD materials that twist the polarisation. However, the light coming from the display device is non-polarised. Thus, using a polarisation filters cuts the intensity in half, not taking into account that the LCD cell itself also absorbs light, further reducing the intensity. There are LCD cells that work on a guest-host system. Such LCD cells, however, typically have values for $\Delta t_1$ and $\Delta t_2$ of the order of several milliseconds, which does not enable the LCD cells to be opened and closed fast enough to be effective. There are LCD cells that have a 'clear' transmissive state and a 'closed' state that highly scatters light. The last thing that seems to be appropriate is a 'closed' state that highly scatters light. This means that incident light is very efficiently scattered, which reduces rather than increases the contrast.

None of the known LCD systems thus is able to meet the requirements.

The inventors have, however, realised that using an LCD cell having an oriented polymer matrix, an LC material with negative $\Delta\epsilon$ and a pleochroic dye it is possible to obtain values for $\Delta t_1$ (to 'open' the LCD cell) and $\Delta t_2$ (to 'close' the LCD cell) of less than 2, preferably less than 1 millisecond. Less than 1 milliseconds is in particular suited for devices which operate at more than 50 Hz.

Figure 5A:
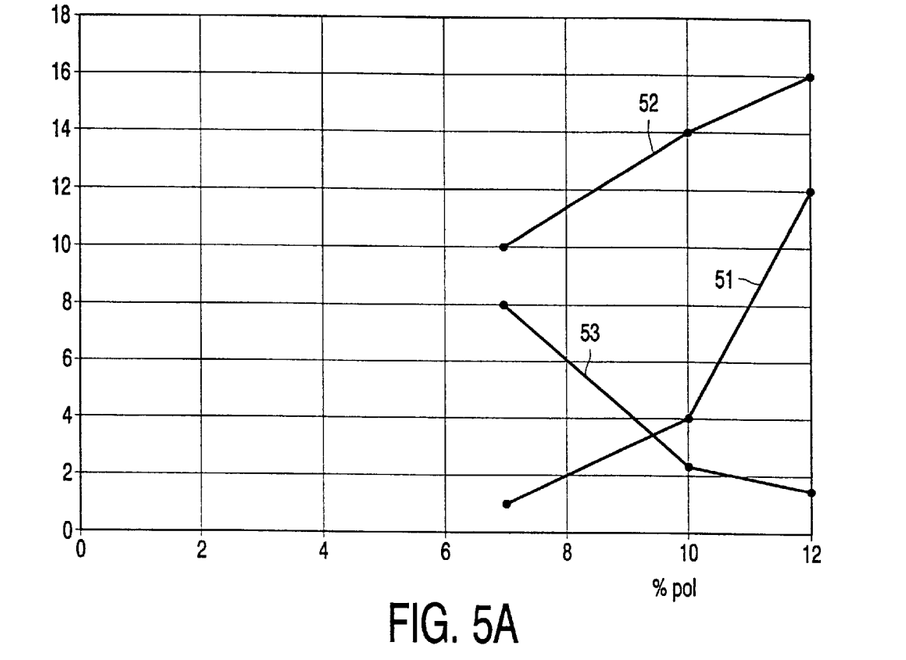
FIGS. 5A and 5B show in a graphical form data on switching voltages, luminance and switching times as a function of weight percentage oriented polymer matrix material.

Using an LCD cell having an oriented polymer matrix, and an LC material with negative $\Delta\epsilon$ enables fast switching times to be obtained. Such a system, however, in its 'closed' state scatters light very efficiently. Thus such a system seems to be inappropriate. LCD cells based on 'guest-host' systems in which pleochroic dyes are used are too slow. Surprisingly, however, the combination of the two enables fast switching times to be obtained (as fast or even faster than using an oriented polymer matrix and an LC material with negative $\Delta\epsilon$), high ratio of transmission and low reflectivity. FIG. 5A shows as a function of weight percentage of oriented polymer network the relative luminance (i.e. the percentage light that is transmitted in the closed state) in line 51 (in percentage), the passive switching time (in 0.1 milliseconds) in line 53, and the needed switching voltage (in 10 Volts) in line 52. It is clear that as the percentage oriented polymer increases a number of parameters are affected. The switching voltage increases, the passive switching time decreases and the relative luminance increases. Thus for for instance 10% by weight of polymer the switching voltage is 140 Volts, the passive switching time 0.25 milliseconds and the relative luminance 4%. The decrease of passive switching time is a positive effect, but the increase in relative luminance is not. Thus preferably the content of the oriented polymer matrix lies between 5 and 15%. Lower percentages give relatively large passive switching times whereas higher percentages give a relatively high luminance even in the closed state. FIG. 5A shows data for an LCD cell with a thickness of 18 micrometer.

Figure 5B:
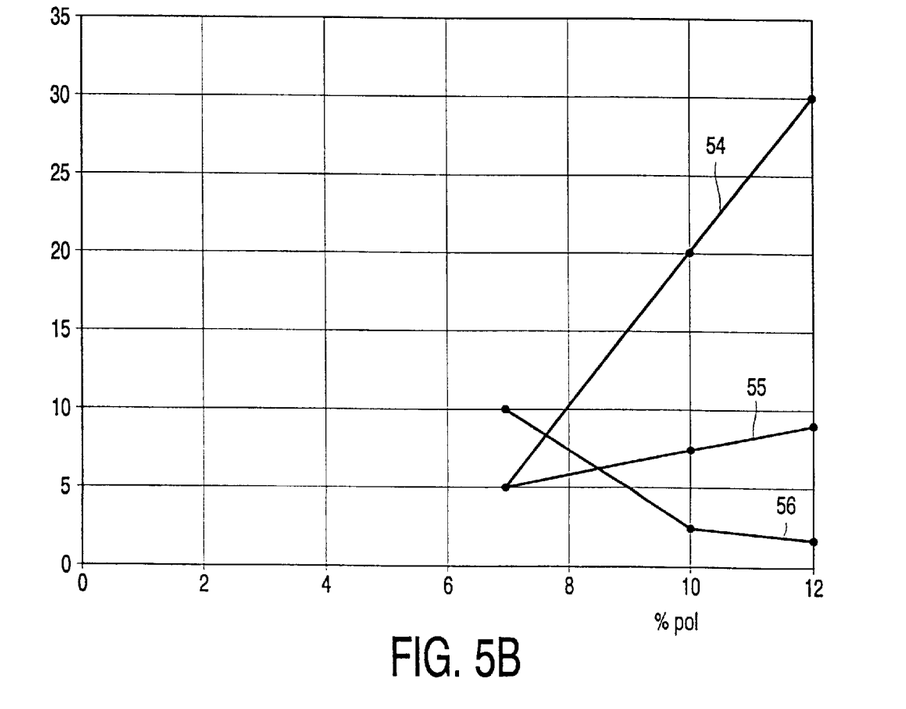

FIG. 5B show the same data for an LCD cell with a thickness of 6 micrometer. The same general trends are seen for relative luminance (line 54), for switching voltage (line 55) and for switching time (line 56) be it that the relative luminance are roughly twice as large, the switching voltages are roughly half of the values given in FIG. 5A. The switching times are comparable.

Figure 6:
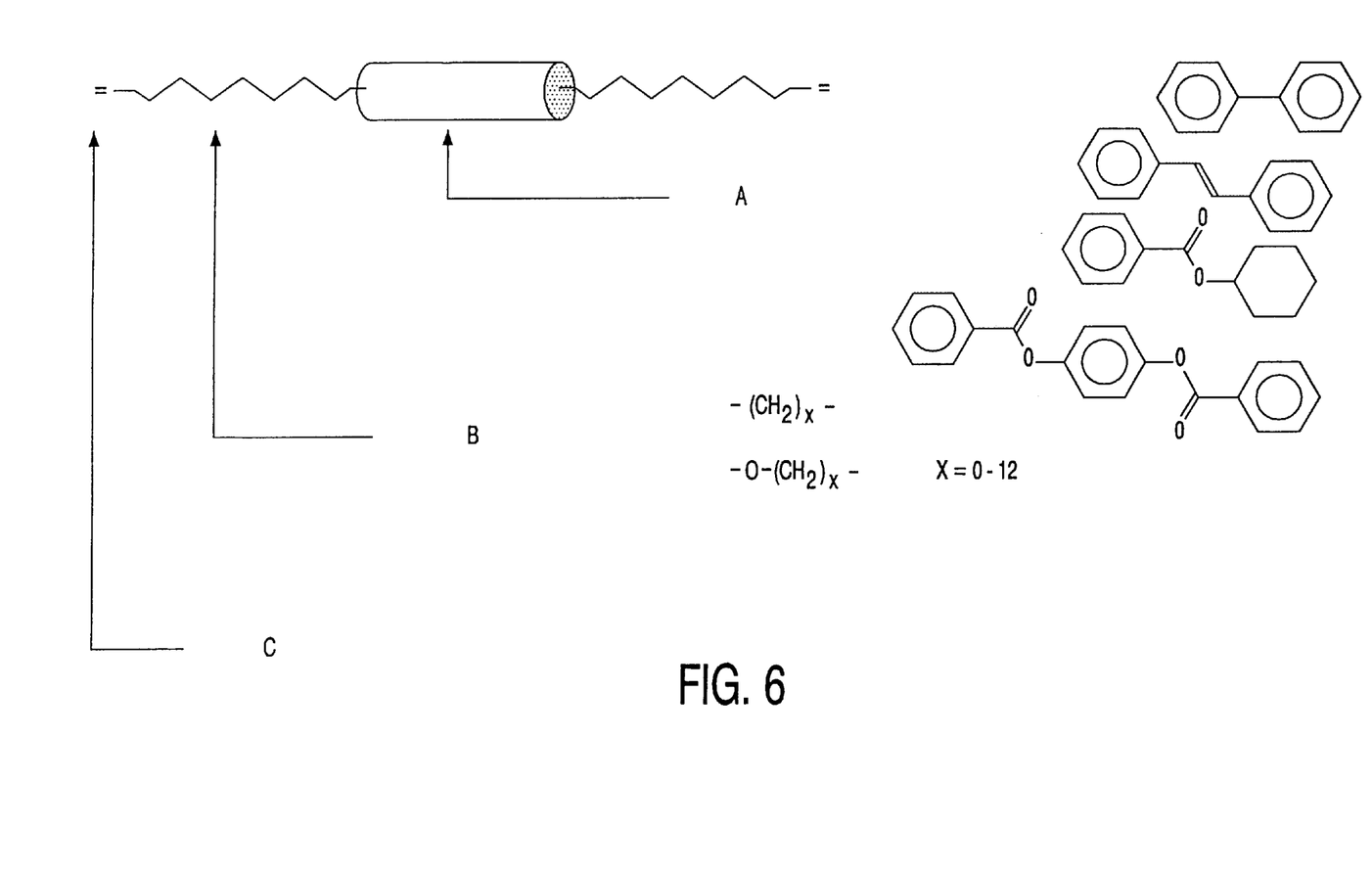
FIG. 6 illustrates some examples of polymerizable liquid crystals usable for the oriented polymer network.

The oriented network is formed be e.g. chain-addition reaction under influence of UV light of materials such as shown schematically in FIG. 6. The liquid crystal molecules comprise a stiff central core A, flexible spacers B and polymerizable end groups C. Some examples of the stiff central core and the flexible spacer groups are indicated in FIG. 6. It will be clear that many variations are possible e.g. by addition of alkyl groups to one or more of the rings of the central core part or extending the central core part with an extra ring, or by longer flexible spacer B (i.e. for instance x larger than 12 or a mixture of the groups —($CH_2$)— and —O— ($CH_2$)—, also the flexible group does not have to be linear but may have side chains. The flexible group at either side of the central core may be different, although it preferably is the same. The polymerizable end groups may e.g. be chosen from meth(acrylates), vinyl ethers, epoxides and thiol-enes.

Figure 7:
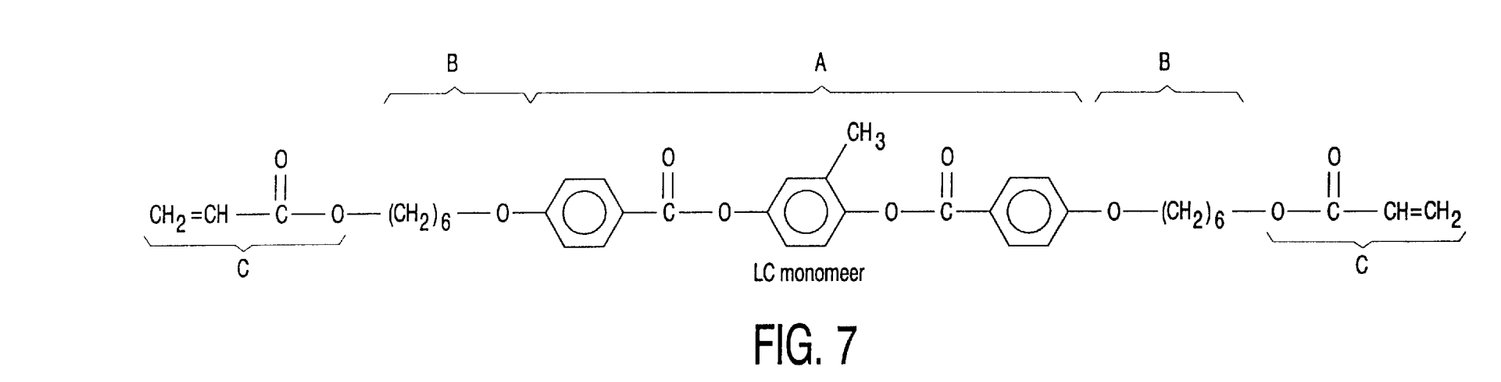
FIG. 7 shows a particular example of a polymerizable liquid crystal.

FIG. 7 shows a particular example of a polymerizable liquid crystal. It is this material that was used for the measurement shown in the graphs (FIGS. 5A and 5B).

Figure 8:
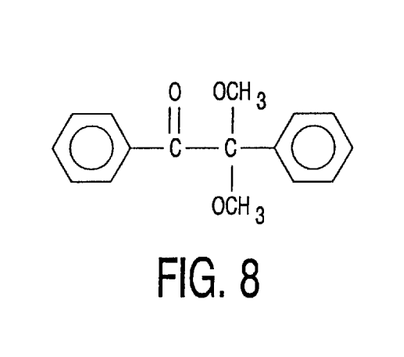
FIG. 8 shows an example of a photoinitiator.

In order to polymerise the liquid crystals such as e.g. shown in FIGS. 6 and 7 a photoinitiator may be used e.g. one as shown in FIG. 8.

Figure 9:
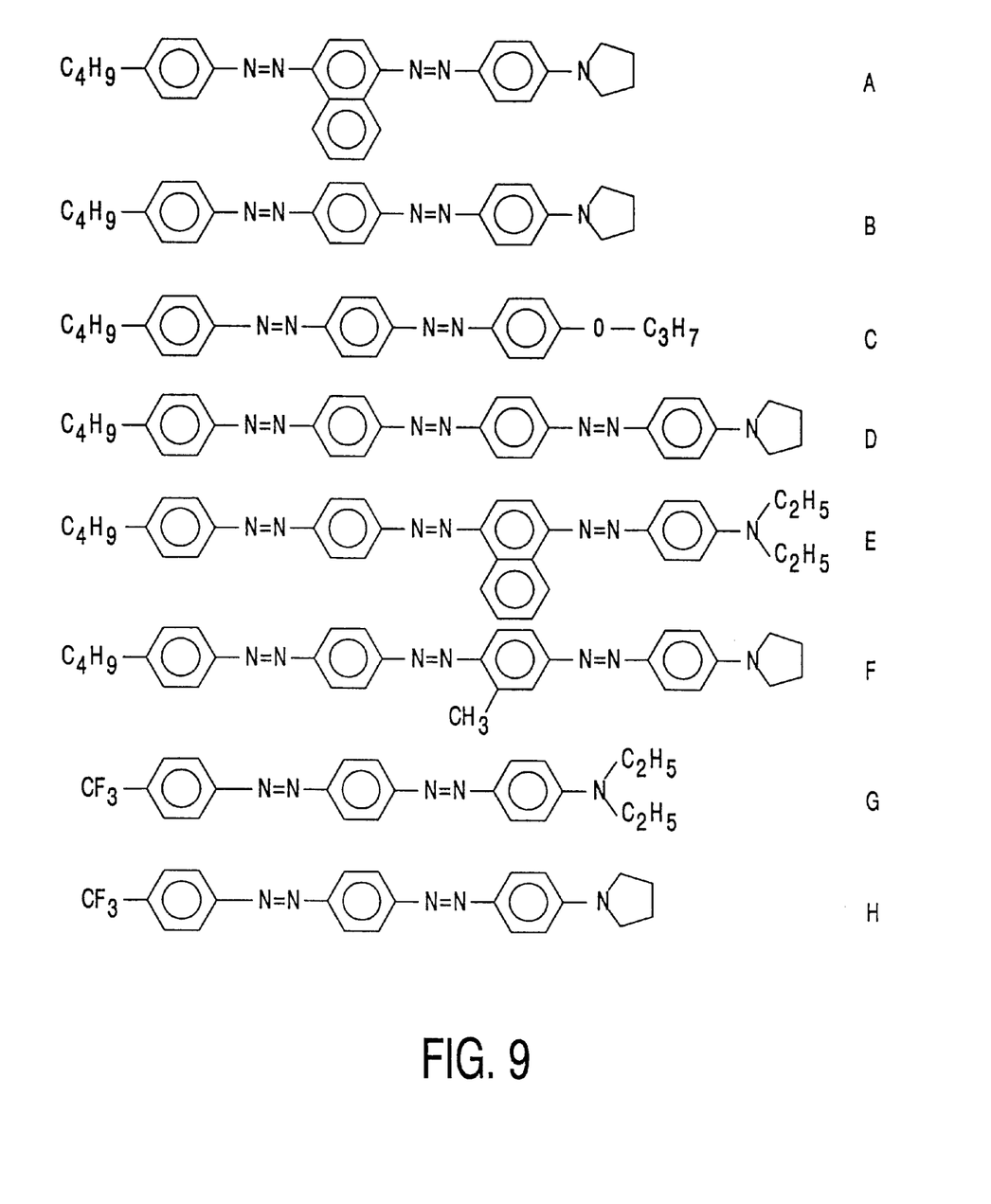
FIG. 9 shows several examples of pleochroic dyes.

Some examples of pleochroic dyes are shown in FIG. 9.

The LC material in the cell may e.g. have the following characteristics:

$\epsilon=4.5$
$\epsilon_x=10.2$
$\Delta\epsilon=-5.7$
$n_o=1.486$
$n_e=1.650$ $\Delta\epsilon$ is negative. Such LC material may be obtained by mixing several LC components and can be bought from LC material manufacturers.

An means for transmitting/blocking selectively the light is made e.g. by providing a substrate e.g. a glass substrate with layers such as shown in FIGS. 2B and 2C by conventional method, the electrodes being formed in a pattern such as shown in FIG. 2A. Filling the cell (i.e. the space between two substrates) with a mixture of a polymerizable liquid crystal material such as e.g. shown in FIGS. 6 or 7, preferably a photoinitiator (such as e.g. shown in FIG. 8) and an LC material and a pleochroic dye (such as e.g. shown in FIG. 9). After filling voltages are put over the electrodes to orient the polymerizable liquid crystal materials. UV light is then shone on the cell or cell to polymerise the polymerisable liquid crystal, forming an oriented polymer network. Within the oriented polymer network the LC material and the pleochroic dye is dispersed.

It will be clear that within the frame work of the invention many variations are possible.

Figure 10:
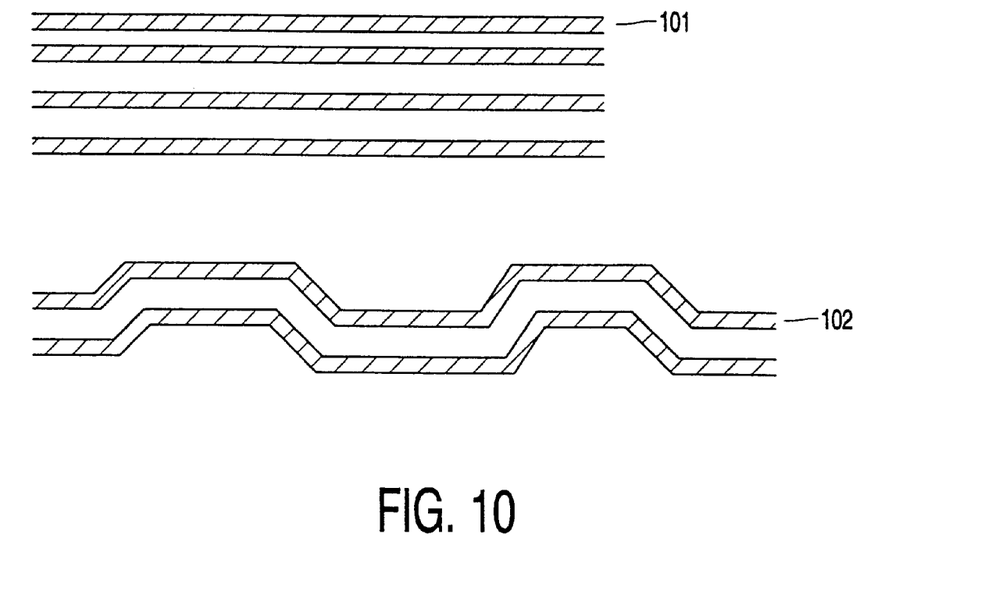
FIG. 10 illustrates some forms for electrodes.
Figure 11:
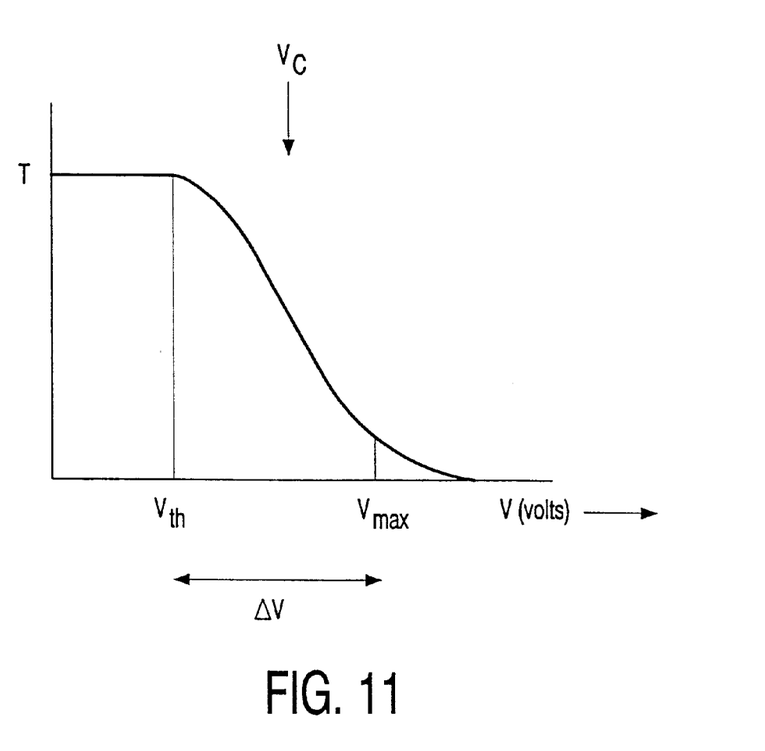
FIG. 11 illustrates the voltage versus transmission curve.

FIG. 10 for instance shows the form and shape of electrode on the substrates. They can for instance be straight (electrodes 101) but especially if the size and shape of electrodes become very small may be formed in a zig-zag manner to reduce moire effects. Moire effects occur when a beat frequency occurs between the lines written in the image and the sequence of cells opened and closed. Preferably the means comprises a large number of cells (or switchable areas within a single cells defined by opposing electrodes) which are switched open and close sequentially i.e. first the highest, then the one below that one, than the next etc. until the bottom one has been opened and closed. Of course the opening and closing must run in step with the lines of the image being written. For devices using phosphor preferably each cell is left open for some time after the corresponding line in the image has been activated. Phosphor emits a substantial amount of their light in the so-called after-glow, which occurs after the actual activation of the phosphor. By keeping the cell or cell areas open for some time this light is also transmitted this light is also transmitted. More than one cell or cell areas may be open at any given time. This reduces the change of motion artifacts being visible in the image. The cell or each cell may have opposing pairs of electrodes or preferably the cell comprises on one surface a common electrode and on the opposing surface separate and separately driven electrodes which define switchable subparts of the cell. In a preferred embodiment the means for transmitting/blocking light comprises opposing surface in between the LCD material is provided, one of said surface comprising a common electrode, the opposing surface comprising a set of separate electrodes and the device comprising means to provide a common electrode voltage to the common electrode and selectively providing switching voltages to the set of separate electrodes FIG. 11 illustrates the voltage (horizontal scale) versus transmission (vertical scale) curve. Below a threshold value $V_{th}$ the cell is transmissive and above a maximum value $V_{max}$ the cell blocks light. The driving voltage range $\Delta V$ is indicated in the figure. The driving voltage does not have to extend beyond $V_{max}$ and the threshold voltage $V_{th}$. By using a common electrode the complexity of the means and of driving the means is reduced, which reduces costs and reduces the risk of malfunctioning. Different driving schemes may be emploed. The common electrode may be set at a voltage between $V_{max}$ and $V_{th}$ and to provide drive signal with maximum magnitude ($V_{max}-V_{th}$) to switch the cells. To prevent charge build-up the polarity of the common electrode voltage may be switched from time to time. It can also be chosen to set the common electrode at $-V_{th}$, and drive with signals levels 0V and ($V_{max}-V_{the}$) to set the common electrode at $-(V_{max}+V_{th})/2$, and drive with signals levels $+(V_{max}-V_{th})/2$ and $-(V_{max-Vth})/2$.

For an LC cell of 18 micrometer (see FIG. 5A) typical voltages are $V_{th}=30$ Volt, $V_{max}=60–80$ Volt, the common electrode may thus be set between −30 and −80 Volt and a votage swing of 30–50 Volt.

It is preferred to drive more than one cell (area) at a time. This improves image perception (less jerky image) and enables to optimise the colour performance especially if slower phosphors are used.

In short the invention may be described by:

A display device (1) is provided with a means (15) for selectively transmitting and blocking light from specific areas of the image. The means for blocking comprises an LCD cells or a number of LCD cells, which cells comprises an oriented polymer network, an LC material with negative $\Delta\epsilon$ and a pleochroic dye.

What is claimed is:

1. Display device comprising a display window and means for generating light at areas of the display window and means for selectively time-sequentially activating the said areas, said display device comprising positioned in front of the display window, or forming part of the display window, a means for transmitting light from activated areas, and blocking at least partly light from non-activated areas, characterized in that the means for transmitting light from activated areas, and blocking at least partly light from non-activated areas comprise an LCD cell or LCD cells, the LCD cell(s) comprising an oriented polymer network, an LC material with negative $\Delta\epsilon$ and a pleochroic dye, the passive relaxation time being less than 2 millisecond and electrodes.

2. Display device as claimed in claim 1, characterized in that the content of the oriented polymer matrix lies between 5 and 15%.

3. Display device as claimed in claim 1, characterized in that the thickness of the LCD material is between 5 and 25 micrometer.

4. Device as claimed in claim 1 characterized in that the electrodes are formed in a non-straight form.

5. Device as claimed in claim 1, characterized in that the means comprise an LCD cell comprising opposing surfaces, one of said surface comprising a common electrode, the opposing surface comprising a set of separate electrodes and the device comprising means to provide a common electrode voltage to the common electrode and selectively providing switching voltages to the set of separate electrodes.

* * * * *